United States Patent [19]

Hagiwara et al.

[11] Patent Number: 4,806,160

[45] Date of Patent: Feb. 21, 1989

[54] METALLIZING COMPOSITION

[75] Inventors: Yoichi Hagiwara; Kenichi Shimizu, both of Kokubu; Satoshi Tanaka, Hayato, all of Japan

[73] Assignee: Kyocera Corporation, Kyoto, Japan

[21] Appl. No.: 803,044

[22] Filed: Nov. 29, 1985

[30] Foreign Application Priority Data

Nov. 30, 1984 [JP] Japan ................................ 59-25438

[51] Int. Cl.$^4$ ................................................ B05B 7/00
[52] U.S. Cl. ................................ 106/1.12; 106/1.22; 106/1.25; 106/1.05
[58] Field of Search ................ 106/1.12, 1.22, 1.05, 106/1.25; 501/153, 152, 154, 92

[56] References Cited

U.S. PATENT DOCUMENTS

| | | | |
|---|---|---|---|
| 4,070,198 | 1/1978 | Chyung et al. | 106/52 |
| 4,097,295 | 6/1978 | Chyung et al. | 106/52 |
| 4,141,739 | 2/1979 | Chyung et al. | 106/52 |
| 4,186,021 | 1/1980 | Chyung et al. | 106/52 |
| 4,222,760 | 9/1980 | Chyung et al. | 106/52 |

OTHER PUBLICATIONS

Loehman, Journal of the American Society, vol. 62, No. 9-10, 491-494, "Preparation and Properties of Yttrium-Silicon- et al."

Makishima et al., Yogyo-Kyokai-shi 88(11) 1980, pp. 65-66, "Preparation of La-Si-O-N Oxynitride Glass of High et al."

Jankowski et al., Communication of the American Ceramic Society, Feb. 1982, C29-30, "Comparative Experimental et al."

Makishima et al., Communications of the American Ceramic Society, Mar. 1983, C55-56, "Microhardness and Transparency of an et al."

Bagaasen et al., Communications of the American Ceramic Society, Apr. 1983, C69-70, "Silicon-Free Oxynitride Glasses Via et al."

Primary Examiner—Josephine Barr
Attorney, Agent, or Firm—Spensley Horn Jubas & Lubitz

[57] ABSTRACT

Disclosed is a metallizing composition comprising an oxynitride glass of the Mg-Al-Si system and/or the Y-Al-Si system and a powder of a high-melting-point metal. This composition has a good affinity with a nitride ceramic material and a carbide ceramic material and is useful for forming metallized layers on substrates of these ceramic materials.

7 Claims, 3 Drawing Sheets

METALLIZING COMPOSITION

BACKGROUND OF THE INVENTION

(1) Field of the Invention

The present invention relates to a metallizing composition. More particularly, the present invention relates to a metallizing composition comprising an oxynitride glass component, which is useful for forming a metallized layer on the surface of a nitride ceramic or carbide ceramic material.

(2) Description of the Prior Art

Bonding of a ceramic material and a metallic material is important in the industrial technique of producing composite products comprising these materials, and since the application field of ceramic bodies obtained by sintering nitrides and carbides such as $Si_3N_4$(silicon nitride), AlN (aluminum nitride) and SiC (silicon carbide) is now broadened because of their excellent high-temperature characteristics and high strength, the technique of bonding these ceramic bodies to metals attracts great attention in the art. Namely, a considerable strength is required for the bonding between a ceramic material and a metallic material, whether this bonding is electrical bonding or mechanical bonding.

Various metallizing methods have been heretofore adopted for this bonding, but these methods involve technical problems.

For example, the known high-temperature metal ceramic joining method, for example, Telefunken method is defective in that when a non-oxide ceramic material is used, bonding having a high strength cannot be obtained. The method for forming a thin metal film on a ceramic body by vacuum deposition is defective in that the applicable shape is limited and the cost is high. The method for casting a metallic material in a ceramic body is insufficient in that the use is restricted. Moreover, the method in which a material having a thermal expansion value intermediate between those of a ceramic body and a metallic material is interposed between them and the frictional welding method are still insufficient because the bonding strength is low and the shape formed by bonding is limited.

SUMMARY OF THE INVENTION

We found that a composition comprising an oxynitride glass having a specific composition described below and a powder of a high-melting-point metal adheres tightly to a non-oxide type ceramic material such as a nitride ceramic or carbide ceramic material and a metallized layer having a high tensile strength can be formed on the surface of the ceramic material treated with this composition.

More specifically, in accordance with the present invention, there is provided a metallizing composition comprising (A) (i) an oxynitride glass of an element of the group IIa of the periodic table, aluminum and silicon, (ii) an oxynitride glass of an element of the group IIIb of the periodic table, aluminum and silicon or (iii) a mixture of the glass (i) and the glass (ii), and (B) a powder of a high-melting-point metal.

Furthermore, in accordance with the present invention, there is provided a metallized ceramic material comprising a ceramic substrate selected from the group consisting of nitride ceramics and carbide ceramics and a metallized layer formed on the surface of the substrate, wherein the metallized layer is formed by coating and firing a metallizing composition comprising (A) (i) an oxynitride glass of an element of the group IIa of the periodic table, aluminum and silicon, (ii) an oxynitride glass of an element of the group IIIb of the periodic table, aluminum and silicon or (iii) a mixture of the glass (i) and the glass (ii), and (B) a powder of a high-melting-point metal.

The metallized layer formed according to the present invention can be widely applied in various fields. For example, after the metallized layer is plated or treated according to customary procedures, a metal material to be bonded is soldered to the metallized layer to form a construction material or a metal having a good electroconductivity is plated on the metallized layer to form a conductor line of a printed board or the like. In accordance with a preferred embodiment of the present invention, the peel strength between the metallized layer and the ceramic body is 50 MPa (mega-pascal) or higher.

DETAILED DESCRIPTION OF THE PREFERRED EMBODIMENTS

As pointed out hereinbefore, the present invention is characterized in that an oxynitride glass having the above-mentioned composition (i), (ii) or (iii) is used as the metallizing glass binder. When this oxynitride glass is used, unexpectedly from the conventional metallizing compositions comprising an oxide glass, a metallized layer having a high bonding strength can be formed on a nitride ceramic material or carbide ceramic material.

The present invention will now be described in detail.

OXYNITRIDE GLASS

Some of the oxynitride glass used for the metallizing composition of the present invention are known as the glass of the Mg-Si-Al-O-N system or the Y-Si-Al-O-N system, but the oxynitride glass used in the present invention is prominently different from the conventional metallizing glass binders in that a part of the oxygen is substituted by nitrogen. In view of the bonding property to a nitride ceramic or carbide ceramic material, it is preferred that the nitrogen content in the oxynitride glass be 2 to 19% by weight, especially 2 to 15% weight, based on the whole glass.

As the element of the group IIa of the periodic table in the oxynitride glass of the type (i) of the present invention, there can be mentioned beryllium (Be), magnesium (Mg), calcium (Ca), strontium (Sr), barium (Ba) and a combination of two or more of the foregoing elements. Among them, magnesium is most preferred. In view of the bondability to the ceramic substrate, it is preferred that the composition of the element of the group IIa of the periodic table, Al and Si (atomic ratio % based on the three components) be within the range surrounded by the four lines I, II, III and IV in FIG. 1. Namely, it is preferred that the composition, as the atomic ratio % based on the three components, of the oxynitride glass (i) be within the range defined by the following formulae:

$$Z \geq 0.30X - 0.70Y \qquad (I)$$

$$Z \geq -0.11X + 0.69Y \qquad (II)$$

$$Y \geq 5 \qquad (III)$$

and $$X \geq 5 \qquad (IV)$$

wherein X, Y and Z stand for the atomic ratios % based on the three components of the element of the group IIa of the periodic table, aluminum and silicon, respectively, and the sum of X, Y and Z is 100.

It is especially preferred that the composition of the oxynitride glass (i) be within the range defined by the following formulae:

$$X \geq 0.37X - 0.66Y \qquad (I')$$

$$Z \geq -0.06X + 0.80Y \qquad (II')$$

$$Y \geq 10 \qquad (III')$$

and $$X \geq 10 \qquad (IV')$$

wherein X, Y and Z are as defined above.

Figure 1:
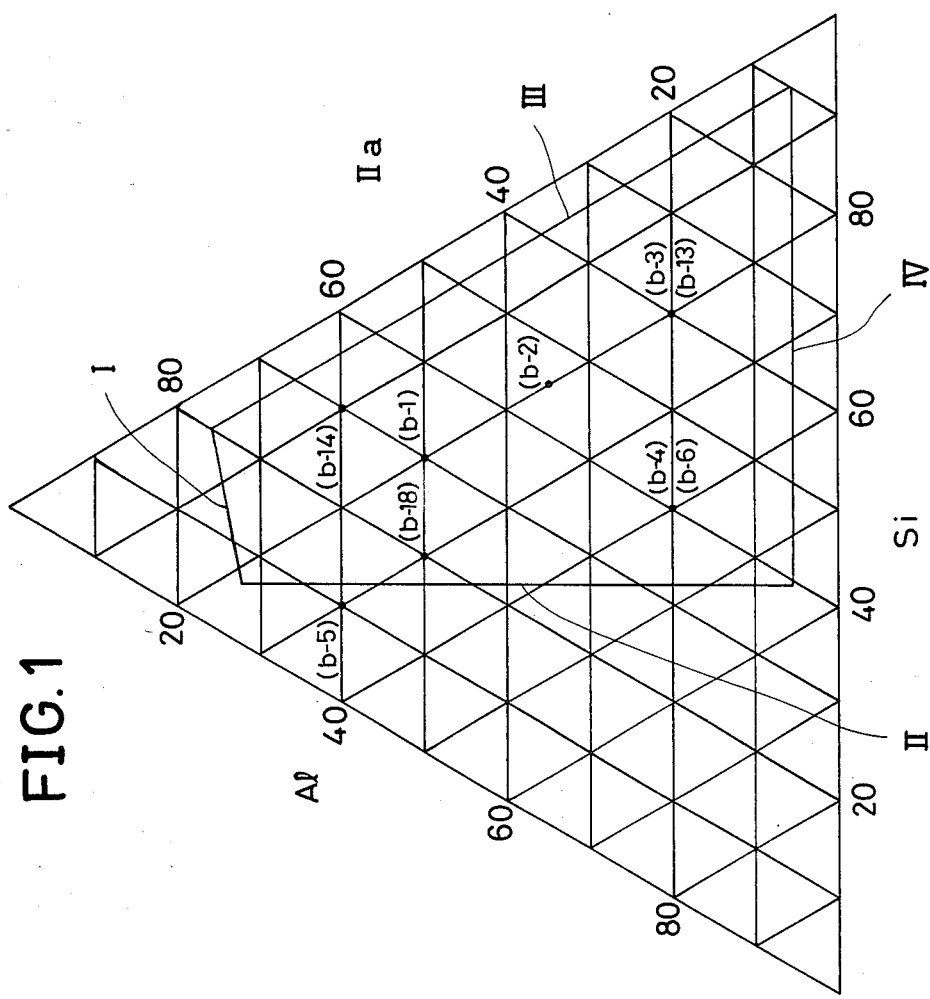
FIG. 1 is a diagram showing a preferred range of the three-component composition of the ozynitride glass of an element of the group IIa of the periodic table, aluminum and silicon to be used in the present invention.

Incidentally, the lines I, II, III and IV in FIG. 1 correspond to the above formulae (I'), (II'), (III') and (IV') where both the sides are equal.

As the element of the group IIIb of the periodic table in the oxynitride glass of the type (ii), there can be mentioned scandium (Sc), yttrium (Y), lanthanum (La), cerium (Ce), praseodymium (Pr), neodium (Nd), promethium (Pm), samarium (Sm), europium (Eu), gadolinium (Gd), terbium (Tb), dysprosium (Dy), holmium (ho), erbium (Er), thalium (Tm), ytterbium (Yb) and lutetium (Lu). Among these elements, yttrium, lanathanum and cerium are preferred.

Figure 2:
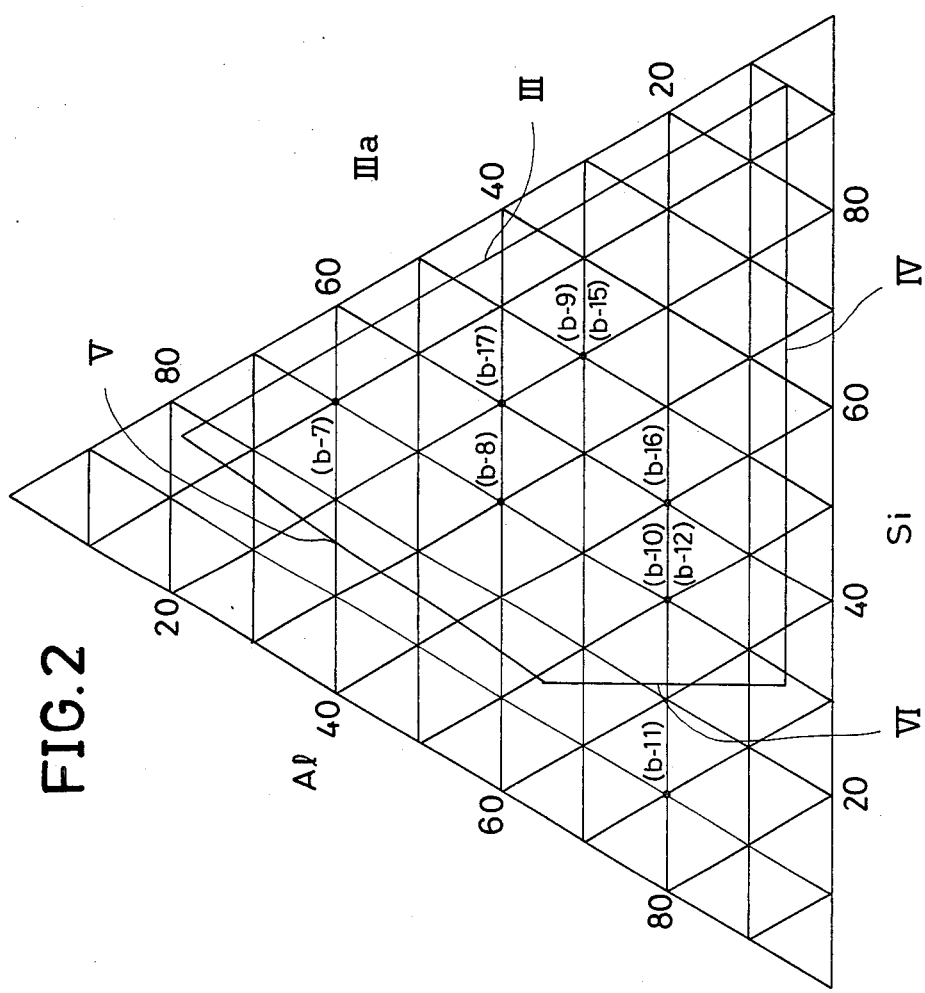
FIG. 2 is a diagram showing a preferred range of the three-component composition of the oxynitride glass of an element of the group IIIb of the periodic table, aluminum and silicon to be used in the present invention.

In view of the bonding property to the ceramic substrate, it is preferred that the composition as the atomic ratio % based on the three components of the oxynitride glass be within the range surrounded by the four lines V, VI, III and IV in FIG. 2. Namely, it is preferred that the composition as the atomic ratio % based on the three components of the oxynitride glass of the type (ii) be within the range defined by the following formulae:

$$Z \geq 0.20X + 0.09Y \qquad (V)$$

$$Z \geq -0.32X + 0.47Y \qquad (VI)$$

$$Y \geq 5 \qquad (III)$$

and $$X \geq 5 \qquad (IV)$$

wherein X, Y and Z stand for the atomic ratios % based on the three components of the element of the group IIIb of the periodic table, aluminum and silicon, respectively, and the sum of X, Y and Z is 100.

It is especially preferred that the composition of the oxynitride glass (ii) be within the range defined by the following formulae:

$$Z \geq 0.28X + 0.14Y \qquad (V')$$

$$Z \geq -0.29X + 0.59Y \qquad (VI')$$

$$Y \geq 10 \qquad (III')$$

and $$X \geq 10 \qquad (IV')$$

wherein X, Y and Z are as defined above.

Incidentally, the lines V, VI, III and IV in FIG. 2 correspond to the formulae (V'), (VI'), (III') and (IV') in which both the sides are equal.

The osynitride glass used in the present invention can be obtained by intimately mixing starting nitrides and oxides (or starting compounds to be converted to oxynitride under melting) so that the above-mentioned composition is produced, and melting the mixture to effect vitrification. Silica ($SiO_2$) and silicon nitride ($Si_3N_4$) can be used as the starting silicon material, and alumina ($Al_2O_3$), aluminum nitride (AlN) and aluminum nitrate may be used as the starting aluminum material. As the starting material of the element of the group IIa or IIIb of the periodic table, there can be used an oxide, a hydroxide, a nitride, a nitrate and a carbonate. Of course, in order that nitrogen is contained in the above-mentioned amount in the final glass, it is indispensible that at least a part of at least one starting material should be a nitride. In the present invention, it is preferred that aluminum nitride by used as at least a part of the starting aluminum material. Namely, if aluminum nitride is used, vitrification is accomplished more homogeneously and uniformly.

The glass used in the present invention comprises the above-mentioned components as the indispensable components, but incorporation of other components is not excluded in the present invention. For example, WC and $ZrO_2$ are inevitably included by wearing of the pulverization medium such as balls while the glass composition is prepared. Incorporation of these components is allowed if the amount is up to 10% by weight based on the total glass composition. If a pulverizing medium composed of $Al_2O_3$ or AlN is used, such a component may be incorporated in the composition of the present invention.

The above-mentioned starting materials are mixed at a predetermined mixing ratio, and the mixture is heated and molten in a non-oxidizing atmosphere and is then cooled. It is preferred that the heating temperature be set at 1500 to 1900° C. If the temperature is lower than 1500° C., the mixture is not easily molten, and if the temperature is higher than 1900° C., the mixture is decomposed and volatilization is caused. Then, the cooled glass is pulverized. In order to facilitate coating or screen printing, it is preferred that the particle size be set at smaller than 100 mesh.

A vacuum atmosphere or an atmosphere of an inert gas such as nitrogen or argon may be used as the non-oxidizing atmosphere. Use of nitrogen gas is advantageous in that since the decomposition equilibrium of the glass is controlled according to the partial pressure of nitrogen gas, gastification of the glass can be controlled and the production loss can be reduced.

The glass of the type (i) or (ii) used in the present invention may be amorphous, or a certain component may be contained in the crystallized state in the composition. For example, a crystal of silicon oxynitride, a Sialon system compound or an N-bearing silicate may be contained in the composition in an amount of up to 40% by volume based on the total composition.

A mixture of the glasses (i) and (ii) may be used as the oxynitride glass in the present invention. In this case, a mixture of powders of the glasses (i) and (ii) may be contained in the metallizing composition, or the glasses (i) and (ii) are melt-mixed in advance and they are used in the form of a mix-molten glass.

METALLIZING COMPOSITION

As the high-melting-point metal powder dispersed and incorporated in the oxynitride glass, there may be used powders of metals, metal silicides, metal carbides and metal borides which are not molten or gasified at the firing temperature and may be present in the form of metals, silicides, carbides, borides or mixtures thereof when the glass is fired. For example, powders of metal elements of the groups IV, V and VIb of the periodic table, such as Ti, Zr, Hf, V, Nb, Ta, Cr, Mo and W, are preferably used. Tungsten, molybdenum, tungsten silicide, molybdenum silicide, tungsten carbide, molybdenum carbide, niobium silicide, tantalum silicide and a mixture of two or more of them are especially preferred. It is preferred that the particle size of the metal powder be smaller than 100 mesh.

The mixing ratio between the high-melting-point metal powder and the oxynitride glass may be changed in a considerably broad range, but it is ordinarily preferred that 35 to 90% by volume, especially 40 to 75% by volume, of the glass powder be mixed with 10 to 65% by volume, especially 25 to 60% by volume, of the metal powder.

An assistant may be used so as to impart good coating property and adhesion to the ceramic substrate to the metallizing composition. For example, an organic binder or organic solvent may be used nitrocellulose and ethyl cellulose, and as the organic solvent, there may be used α-terpineol and butylcardetol acetate. In view of the coating property and adhesion, it is preferred that the organic binder be used in an amount of 1 to 10% by weight based on the sum of the glass and metal and the organic solvent be used in an amount of 10 to 20% by weight based on the sum of the glass and metal.

METALLIZED CERAMICS AND PROCESS FOR PREPARATION THEREOF

Figure 3:
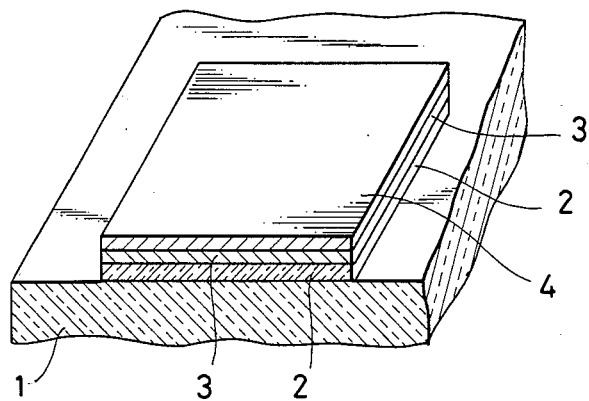
FIG. 3 is a partially sectional perspective view of a metallized structure according to the present invention.

FIG. 3 is a partially sectional perspective view of the metallized structure according to the present invention. The metallizing composition is fixed and fired on the nitride or carbide ceramic substrate 1 over an area necessary for bonding to form a metallized layer 2. For example, a nickel layer 3 is formed on the metallized layer 2 by plating and a gold layer 4 is formed on the nickel layer 3 by plating. In this case, soldering is possible on the gold layer 4.

As the nitride ceramic substrate, there may be used a sintered body composed of at least one member selected from the group consisting of silicon nitride ($Si_3N_4$), aluminum nitride (AlN), Sialon, boron nitride (BN), titanium nitride (TiN) and zirconium nitride (ZrN). Of course, other components such as an oxide ceramic material or a sintering aid may be contained in the nitride ceramic substrate, so far as the essential properties of the nitride ceramic material are not lost. At least one member selected from oxides of elements of the groups IIa and IIIb of the periodic table, aluminum and silicon and aluminum nitride may be used as the sintering aid. The sintering aid forms the main phase of the interparticle phase by sintering, and this interparticle phase is ordinarily composed of an oxynitride glass or an oxynitride crystal formed from this oxynitride glass.

As the carbide ceramic substrate, there may be used a sintered body composed of at least one member selected from the group consisting of silicon carbide (SiC), boron carbide ($B_4C$), titanium carbide (TiC), tungsten carbide (WC), zirconium carbide (ZrC) and chromium carbide.

The surface to be metallized of the ceramic substrate 1 molded into a predetermined shape and sintered is polished to form a surface to be metallized. Then, the above-mentioned metallizing composition is coated on this surface by silk screen printing or other coating means, and the coated composition is dewaxed at a low temperature and then heated and fire in a non-oxidizing atmosphere maintained at a temperature of 1000 to 1600° C., preferably 1300 to 1600° C. As the non-oxidizing atmosphere, there can be used a vacuum atmosphere and an atmosphere of an inert gas such as nitrogen or argon. If nitrogen gas is used, the gas decomposition equilibrium can be controlled according to the partial pressure of nitrogen gas and vitrification of the glass can be controlled. Furthermore, in this case, no bubbles are formed in the metallized layer and an excellent metallized ceramic body can be prepared efficiently.

It is preferred that the thickness of the metallized layer be 5 to 50 mm, especially 10 to 30 mm.

When the above-mentioned oxynitride glass is used for formation of the metallized layer according to the present invention, migration of substances in the ceramics bonded by this glass is facilitated and the equilibrium vapor pressure of the ceramics can be maintained in the state where the temperature is low, decomposition or generation of bubbles can be drastically controlled. Furthermore, the wettability of the glass with the non-oixide type ceramic material is good and formation of bubbles can be controlled by the nitrogen component contained at a high concentration in the glass as compared with the case of an oxide glass. Accordingly, the strength of bonding of the metallized layer to the non-oxide type ceramic material can be highly improved.

The oxynitride glass is excellent over other glasses in the strength and hardness and has a high viscosity at a high temperature, and moreover, the oxynitride glass is excellent in the water resistance and chemical resistance. Therefore, the metallized ceramic material of the present invention can be preferably used for a construction material to be exposed to a high temperature.

As pointed out hereinbefore, a metal material to be bonded is soldered to the metallized layer to form a construction material, or a metal having a high electroconductivity, such as Au or Ni, is plated on the metallized layer to form a conductor line of a printed board, which may be applied to an electric material.

The metallized ceramic body of the present invention has an excellent bonding strength. The method for measuring the bonding strength after soldering will now be described with reference to FIG. 4. A nitride or carbide ceramic body 1 as the test piece S is tightly secured in the state where a compressive force (indicated by a thick arrow) acting toward the center from both the left and right is given by a vise 8, and a hanging fitting 5 is fixed to the Au layer 4 by a solder 6 and a push-pull gauge (spring balance) 7 is attached to the top end of the hanging fitting 5. In this state, the hanging fitting 5 is pulled up at a speed of 30 mm/min, and the strength at the moment when the metallized layer 2 is peeled from the ceramic body 1 is read from the gauge 7.

The present invention will now be described in detail with reference to the following example that by no means limit the scope of the invention.

EXAMPLE

(1) Nitride Ceramic Substrate

Starting materials for sintering aid-containing nitride ceramics, as shown in Table 1, were pulverized and mixed, and the mixtures were molded into a desirable shape and the binder was removed. Then, sintering was carried out in a nitrogen atmosphere under sintering conditions shown in Table 1. The surface to be metallized of the sintered body was polished by a diamond wheel #250. Thus, test pieces (a-1 through a-7) were prepared.

tered in an argon gas atmosphere (1 atmosphere) at a temperature of 2050° C. for 30 minutes to obtain a sintered body containing 0.5% by weight of boron and 0.8% by weight of carbon. The surface to be metallized of the sintered body was polished by a diamond wheel #250 to obtain a test piece a-8.

Separately, $Al_2O_3$ and $Y_2O_3$ were added to α-SiC powder so that the amounts of $Al_2O_3$ and $Y_2O_3$ were 3.5% by weight and 0.6% by weight based on the total mixture, respectively, and a molded body was formed from the mixture in the same manner as described above. The molded body was sintered in an argon gas atmosphere at 1950° C. for 30 minutes. The surface to be metallized of the sintered body was polished by a diamond wheel #250 to obtain a test piece a-9.

(3) Oxynitride Glass

Starting materials shown in Table 2 were intimately mixed at a mixing ratio shown in Table 2, and the mixture was charged in an SiC crucible having the inner surface coated with hexagonal BN. The mixture was heated and molten in a nitrogen gas atmosphere under melting conditions shown in Table 2 and the metal was

TABLE 1

(Nitride Ceramic Substrates)

| Test Piece No. | Kinds and Mixing Ratios (% by weight) of Starting Materials | | Sintering Conditions | | |
|---|---|---|---|---|---|
| | Main Component | Sintering Aid | Temperature (°C.) | Time (hours) | Sintering Method |
| a-1 | $Si_3N_4$ (90) | MgO(3), $Al_2O_3$(7) | 1650 | 2.0 | NS |
| a-2 | $Si_3N_4$ (93) | $Y_2O_3$(7) | 1700 | 0.5 | HP |
| a-3 | $Si_3N_4$ (90) | $Y_2O_3$(3), $Al_2O_3$(7) | 1750 | 1.0 | NS |
| a-4 | $Si_3N_4$ (90) | $Y_2O_3$(5), AlN(3), $Al_2O_3$(2) | 1750 | 3.0 | NS |
| a-5 | AlN (95) | $Y_2O_3$(5) | 1850 | 1.0 | NS |
| a-6 | AlN (97) | CaO(3) | 1900 | 1.0 | NS |
| a-7 | AlN (92) | $Y_2O_3$(4), $La_2O_3$(4) | 1900 | 1.0 | NS |

Note
NS: normal sintering
HP: hot pressing

(2) Carbide Ceramic Substrate

β-SiC powder was charged in a polyethylene vessel together with $B_4C$ powder and carbon powders were mixed polyamide balls were added and the powders were mixed for 24 hours in methanol. A compression-molded body having a size of 36 mm×36 mm×2 mm was formed under a pressure of 100 MPa and was sinnaturally cooled. The obtained cullet was roughly pulverized in a mortar and the particle size was adjusted to smaller than 325 mesh by a shaking mill.

Incidentally, MgO, CaO and SrO shown in Table 2 were those formed from $Mg(OH)_2$, $CaCO_3$ and $SrCO_3$, respectively.

TABLE 2

(Oxynitride Glasses)

| Sample No. | Kinds and Mixing Ratios (% by weight) of Glass Components | Atomic Ratios (%) of Element of Group IIa or IIIb, Al and Si | | | Nitrogen Content (% by weight) | Melting Conditions | |
|---|---|---|---|---|---|---|---|
| | | Element of Group IIa or IIIb | Al | Si | | Melting Temperature (°C.) | Heating Time (hours) |
| b-1 | MgO(43.5), AlN(17.7), $SiO_2$(38.8) | 50 | 20 | 30 | 6.0 | 1700 | 2 |
| b-2 | MgO(28.6), AlN(16.6), $SiO_2$(54.8) | 35 | 20 | 45 | 5.7 | 1700 | 2 |
| b-3 | MgO(15.4), AlN(15.7), $SiO_2$(68.9) | 20 | 20 | 60 | 5.4 | 1700 | 2 |
| b-4 | MgO(16.6), AlN(33.9), $SiO_2$(49.5) | 20 | 40 | 40 | 11.6 | 1650 | 2 |
| b-5 | MgO(56.9), AlN(28.9), $SiO_2$(14.2) | 60 | 30 | 10 | 9.9 | 1750 | 1 |
| b-6 | MgO(17.6), AlN(35.8), $SiO_2$(26.2), $Si_3N_4$(20.4) | 20 | 40 | 40 | 22.1 | 1650 | 2 |
| b-7 | $Y_2O_3$(75.4), AlN(4.6), $SiO_2$(20.0) | 60 | 10 | 30 | 1.6 | 1750 | 1 |
| b-8 | $Y_2O_3$(59.9), AlN(16.3), $SiO_2$(23.8) | 40 | 30 | 30 | 5.6 | 1750 | 2 |
| b-9 | $Y_2O_3$(47.0), AlN(11.4), $SiO_2$(41.6) | 30 | 20 | 50 | 3.9 | 1700 | 1 |
| b-10 | $Y_2O_3$(37.0), AlN(33.6), $SiO_2$(29.4) | 20 | 50 | 30 | 11.5 | 1750 | 1 |
| b-11 | $Y_2O_3$(39.4), AlN(50.1), $SiO_2$(10.5) | 20 | 70 | 10 | 17.1 | 1750 | 2 |
| b-12 | $Y_2O_3$(39.1), AlN(35.5), $SiO_2$(5.2) $Si_3N_4$(20.2) | 20 | 50 | 30 | 20.2 | 1750 | 1 |
| b-13 | SrO(31.9), AlN(12.6), $SiO_2$(55.5) | 20 | 20 | 60 | 4.3 | 1650 | 1 |
| b-14 | CaO(60.3), AlN(7.3), $SiO_2$(32.4) | 60 | 10 | 30 | 2.5 | 1650 | 1 |
| b- | $La_2O_3$(56.1), AlN(9.4), $SiO_2$(34.5) | 30 | 20 | 50 | 3.2 | 1700 | 1 |
| b-16 | $CeO_2$(44.7), AlN(22.4), $SiO_2$(32.9) | 20 | 40 | 40 | 7.6 | 1700 | 1 |
| b-17 | $Yb_2O_3$(71.0), AlN(7.4), $SiO_2$(21.6) | 40 | 20 | 40 | 2.5 | 1750 | 1 |

TABLE 2-continued

| | | (Oxynitride Glasses) | | | | | |
|---|---|---|---|---|---|---|---|
| | | Atomic Ratios (%) of Element of Group IIa or IIIb, Al and Si | | | Nitrogen | Melting Conditions | |
| Sample No. | Kinds and Mixing Ratios (% by weight) of Glass Components | Element of Group IIa or IIIb | Al | Si | Content (% by weight) | Melting Temperature (°C.) | Heating Time (hours) |
| b-18 | MgO(45.0), Al$_2$O$_3$(34.2), Si$_3$N$_4$(20.8) | 50 | 30 | 20 | 8.3 | 1750 | 2 |

(4) Coating and Firing

A high-melting point metal powder and the above-mentioned oxynitride glass were mixed at a mixing ratio shown in Table 3 or 4, and an organic binder and an organic solvent were added to the mixture to form a metallixing composition.

The composition was coated in a thickness of 20 to 30 μm on the ceramic substrate obtained in (1) or (2) above over an area of 4 mm$^2$, and firing was carried out in a nitrogen gas atmosphere under conditions shown in Table 3 or 4 to form a metallized layer.

Figure 4:
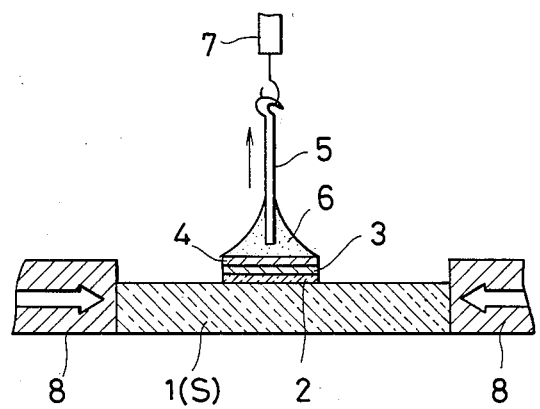
FIG. 4 is a diagram illustrating the outline of the test for measuring the strength of the metallized structure shown in FIG. 3 after soldering.

Nonelectrode plating of Ni was performed on the metallized layer, and according to the method described hereinbefore with reference to FIG. 4, the hanging fitting was soldered and the tensile strength between the metallized layer and the ceramic substrate was measured. Incidentally, for this measurement, twenty test pieces were used at each run.

The obtained results are shown in Tables 3 and 4. Incidentally, the results obtained with respect to the metallized nitride ceramic substrate are shown in Table 3 and the results obtained with respect to the metallized carbide ceramic substrate are shown in Table 4.

TABLE 3

| Run No. | Nitride Ceramic Substrate | Components and Mixing Ratios (% by volume) of Metallizing Composition | | Firing Conditions | | Average Value of Tensile Strength(MPa) | Deviation of Strength $\sigma_{n-1}$(MPa) |
|---|---|---|---|---|---|---|---|
| | | Oxynitride Glass | High-Melting-Point Metal Powder | Temperature(°C.) | Time (minutes) | | |
| 1 | a-1 | b-1 (60) | W (40) | 1370 | 15 | 75 | 6 |
| 2 | a-2 | b-2 (67) | Mo (33) | 1350 | 15 | 61 | 5 |
| 3 | a-3 | b-8 (75) | WSi$_2$ (25) | 1400 | 30 | 56 | 5 |
| 4 | a-4 | b-7 (72) | MoSi$_2$ (28) | 1400 | 30 | 51 | 6 |
| 5 | a-5 | b-2 (51) | WC (49) | 1350 | 15 | 75 | 6 |
| 6 | a-6 | b-7 (65) | MoC (35) | 1400 | 30 | 50 | 5 |
| 7 | a-7 | b-1 (43) | NbSi$_2$ (57) | 1350 | 15 | 62 | 6 |
| 8 | a-5 | b-1 (92) | WC (8) | 1370 | 15 | <10 | — |
| 9 | a-5 | b-1 (30) | WC (70) | 1370 | 15 | <10 | — |
| 10 | a-1 | b-5 (60) | W (40) | 1370 | 15 | 15 | 3 |
| 11 | a-2 | b-6 (67) | Mo (33) | 1400 | 30 | 18 | 5 |
| 12 | a-5 | b-14 (13) | MoSi$_2$ (47) | 1370 | 15 | 72 | 6 |
| 13 | a-5 | b-15 (71) | NbSi$_2$ (29) | 1410 | 30 | 51 | 8 |
| 14 | 1-5 | b-17 (41) | WC (59) | 1410 | 30 | 62 | 5 |
| 15 | a-4 | b-1 (21) / b-7 (35) | Mo (44) | 1350 | 15 | 76 | 6 |
| 16 | a-4 | b-2 (14) / b-8 (33) | WSi$_2$ (53) | 1350 | 15 | 72 | 5 |

TABLE 4

| Run No. | Nitride Ceramic Substrate | Components and Mixing Ratios (% by volume) of Metallizing Composition | | Firing Conditions | | Average Value of Tensile Strength(MPa) | Deviation of Strength $\sigma_{n-1}$(MPa) |
|---|---|---|---|---|---|---|---|
| | | Oxynitride Glass | High-Melting-Point Metal Powder | Temperature(°C.) | Time (minutes) | | |
| 17 | a-8 | b-3 (75) | W (25) | 1350 | 15 | 63 | 6 |
| 18 | a-8 | b-10 (63) | WC (37) | 1400 | 30 | 58 | 5 |
| 19 | a-8 | b-4 (41) | MoSi$_2$ (59) | 1350 | 15 | 56 | 5 |
| 20 | a-8 | b-3 (43) | Mo (57) | 1350 | 15 | 67 | 6 |
| 21 | a-9 | b-9 (55) | MoC (45) | 1400 | 30 | 65 | 6 |
| 22 | a-9 | b-9 (71) | WSi$_2$ (29) | 1400 | 30 | 51 | 6 |
| 23 | a-9 | b-4 (52) | NbSi$_2$ (48) | 1350 | 15 | 60 | 5 |
| 24 | a-8 | b-3 (96) | W (4) | 1350 | 15 | <10 | — |
| 25 | a-8 | b-3 (29) | W (71) | 1350 | 15 | <10 | — |
| 26 | a-8 | b-11 (43) | Mo (57) | 1400 | 30 | 15 | 3 |
| 27 | a-9 | b-12 (71) | WSi$_2$ (29) | 1400 | 30 | 15 | 3 |
| 28 | a-8 | b-14 (39) | MoC (61) | 1370 | 15 | 67 | 5 |
| 29 | a-8 | b-16 (42) | WSi$_2$ (58) | 1410 | 30 | 64 | 6 |
| 30 | a-9 | b-17 (74) | WC (26) | 1410 | 30 | 54 | 7 |
| 31 | a-8 | b-3 (21) / b-9 (26) | W (53) | 1350 | 15 | 59 | 5 |
| 32 | a-9 | b-4 (34) | Mo (41) | 1350 | 15 | 67 | 5 |

TABLE 4-continued

| Run No. | Nitride Ceramic Substrate | Components and Mixing Ratios (% by volume) of Metallizing Composition | | Firing Conditions | | Average Value of Tensile Strength(MPa) | Deviation of Strength $\sigma_{n-1}$(MPa) |
|---|---|---|---|---|---|---|---|
| | | Oxynitride Glass | High-Melting-Point Metal Powder | Temperature(°C.) | Time (minutes) | | |
| | | b-10 (25) | | | | | |
| 33 | a-8 | b-18 (75) | W (25) | 1400 | 15 | 51 | 7 |

As is seen from Table 3, at runs 1 through 7, 12 and 16, the tensile strength was excellent and was 50 MPa or higher. In contrast, at runs 8 and 9, the strength was drastically reduced because the mixing ratio between the glass and metal was outside the range specified in the present invention. Moreover, at runs 10 and 11, no high tensile strength could be obtained because the composition was outside the range of the present invention.

From the results shown in Table 4, it is seen that at runs 17 through 23 and 28 through 33, the tensile strength was excellent and 51 MPa or higher. In contrast, at runs 24 and 25, the tensile strength was poor because the mixing ratio between the glass and metal was outside the range specified in the present invention, and at runs 26 and 27, the tensile strength was low because the composition was outside the range of the present invention.

It was found that similar results were obtained when $TaSi_2$, $TiN$, $TiB_2$, $ZrB_2$ or $ZrN$ was used as the high-melting-point metal powder.

When a metallizing composition comprising 85% by weight of Mo, 10% by weight of Mn and 5% by weight of $SiO_2$ was fired on an alumina ceramic material (having a purity of 96% by weight) containing a sintering aid comprising $SiO_2$, MgO and CaO according to the known high-temperature metal method, the tensile strength was about 50 MPa as determined according to the above-mentioned method. However, this metallizing composition was not strongly bonded to a non-oxide type ceramic material and peeling was readily caused. On the other hand, when the metallizing composition of the present invention was used for a non-oxide type ceramic material, the bonding property higher than that of the above-mentioned known metallizing composition to an alumina ceramic material could be obtained.

We claim:
1. A metallizing composition comprising:
   (A) 35 to 90% by volume of:
      (i) an oxynitride glass of aluminum, silicon and at least one element selected from the group consisting of beryllium, magnesium, calcium, strontium and barium;
      (ii) an oxynitride glass of aluminum, silicon and at least one element selected from the group consisting of scandium, yttrium, lanthanum, cerium, praseodymium, neodium, promethium, samarium, europium, gadolinium, terbium, dysprosium, holmium, erbium, thalium, ytterbium and lutetium; or
      (iii) a mixture of glasses (i) and (ii); wherein said oxynitride glass contains nitrogen in an amount of 2 to 19% by weight, based on the glass; and
   (B) 65 to 10% by volume of a high-melting-point metal powder which comprises at least one metal in elemental form or a compound thereof, said at least one metal being selected from the group consisting of titanium, zirconium, hafnium, vanadium, niobium, tantalum, cromium, molybdenum and tungsten, and said compound being selected from the group consisting of silicides, carbides and borides.

2. A metallizing composition as set forth in claim 1, wherein the oxynitride glass (i) has a composition, as the atomic ratio % based on the three components, defined by the following formulae:

$Z \geq 0.30X - 0.70Y$ $Z \geq -0.11X + 0.69Y$ $Y \geq 5$ and $X \geq 5$ wherein X, Y and Z stand for the atomic ratios % based on the three components of the at least one element, aluminum and silicon, respectively, and the sum of X, Y and Z is 100.

3. A metallizing composition as set forth in claim 1, wherein the oxynitride glass (ii) has a composition, as the atomic ratio % based on the three components, defined by the following formulae:

$Z \geq 0.20X + 0.09Y$ $Z \geq -0.32X + 0.47Y$ $Y \geq 5$ and $X \geq 5$ wherein X, Y and Z stand for the atomic ratios % based on the three components of the at least one element, aluminum and silicon, respectively, and the sum of X, Y and Z is 100.

4. A metallizing composition as set forth in claim 1, wherein the at least one element of oxynitride glass (i) is magnesium.

5. A metallizing composition as set forth in claim 1, wherein the at least one element of oxynitride glass (ii) is yttrium.

6. A metallizing composition as set forth in claim 1, wherein the high-melting-point powder is a powder of a metal or metal compound selected from tungsten, molybdenum, tungsten silicide, molybdenum silicide, tungsten carbide, molybdenum carbide, niobium silicide and tantalum silicide.

7. A metallizing composition comprising:
   (A)
      (i) an oxynitride glass of aluminum, silicon and at least one element selected from the group consisting of beryllium, magnesium, calcium, strontium and barium;

(ii) an oxynitride glass of aluminum, silicon and at least one element selected from the group consisting of scandium, yttrium, lanthanum, cerium, praseodymium, neodium, promethium, samarium, europium, gadolinium, terbium, dysprosium, holmium, erbium, thalium, ytterbium and lutetium; or (iii) a mixture of glasses (i) and (ii); wherein said oxynitride glass contains nitrogen in an amount of 2 to 19% by weight, based on the glass; and (B) a high-melting-point metal powder which comprises at least one metal in elemental form or a compound thereof, said at least one metal being selected from the group consisting of titanium, zirconium, hafnium, vanadium, niobium, tantalum, chromium, molybdenum and tungsten, and said compound being selected from the group consisting of silicides, carbides and borides.

* * * * *